United States Patent
Ramachandrula et al.

(10) Patent No.: US 9,400,806 B2
(45) Date of Patent: Jul. 26, 2016

(54) IMAGE TRIGGERED TRANSACTIONS

(75) Inventors: Sitaram Ramachandrula, Bangalore (IN); Dinesh Mandalapu, Bangalore (IN); Suryaprakash Kompalli, Bangalore (IN); Anjaneyulu Seetha Rama Kuchibhotla, Bangalore (IN); Nagabhushana Ayyanahal Matad, Bangalore (IN); Srinivasu Godavari, Bangalore (IN); Geetha Manjunath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 14/124,720

(22) PCT Filed: Jun. 8, 2011

(86) PCT No.: PCT/IN2011/000383
§ 371 (c)(1),
(2), (4) Date: Dec. 8, 2013

(87) PCT Pub. No.: WO2012/168942
PCT Pub. Date: Dec. 13, 2012

(65) Prior Publication Data
US 2014/0108456 A1 Apr. 17, 2014

(51) Int. Cl.
*G06F 17/30* (2006.01)
*G06K 9/00* (2006.01)

(52) U.S. Cl.
CPC ...... *G06F 17/30247* (2013.01); *G06K 9/00449* (2013.01)

(58) Field of Classification Search
None
See application file for complete search history.

(56) References Cited

U.S. PATENT DOCUMENTS

| | | | |
|---|---|---|---|
| 5,751,836 A | 5/1998 | Wildes et al. | |
| 6,583,813 B1 | 6/2003 | Enright et al. | |
| 2005/0065893 A1* | 3/2005 | Josephson | G06Q 20/14 705/64 |
| 2007/0253620 A1 | 11/2007 | Nagarajan et al. | |
| 2008/0249931 A1* | 10/2008 | Gilder | G06Q 20/04 705/39 |
| 2010/0177964 A1 | 7/2010 | King et al. | |
| 2010/0278453 A1 | 11/2010 | King | |
| 2010/0331043 A1 | 12/2010 | Chapman et al. | |

FOREIGN PATENT DOCUMENTS

| | | |
|---|---|---|
| WO | 9721188 A1 | 6/1997 |
| WO | 2006023806 A2 | 3/2006 |

OTHER PUBLICATIONS

H. Chauhan et al., "WAV: Voice access to web information for masses," W3C Workshop 2010, May 6-7, 2010, New Delhi, India.
P. Mistry et al., "SixthSense: A wearable gestural interface," SIGGRAPH Asia 2009, Yokohama, Japana, Dec. 16-19, 2009.
International search report and written opinion in counterpart PCT patent application PCT/IN2011/000383, dated Dec. 15, 2011.

* cited by examiner

*Primary Examiner* — Syed Hasan
(74) *Attorney, Agent, or Firm* — Van Cott, Bagley, Cornwall & McCarthy

(57) ABSTRACT

In one example, a method for image triggered transactions includes capturing an image of a document with an imaging device and searching a database for a template matching the captured image. If a matching template is found for the captured image, then retrieving pre-authored tasks associated with the captured image, extracting fields from the image related to the tasks, processing the extracted fields to obtain content to complete the tasks; and executing the selected task. If a matching template is not found for the captured image, then an authoring application is launched to add the captured image as a new template and author tasks associated with the captured image.

14 Claims, 7 Drawing Sheets

IMAGE TRIGGERED TRANSACTIONS

BACKGROUND

Transactions take a number of forms, including paper based transactions. Paper based transactions occur when information is physically written or printed on a surface and a transaction occurs that relies on that information. For example, receiving a printed utility bill in the mail triggers a paper based transaction where the recipient uses the information on the utility bill to submit payment. Paper based transactions can be completed in a number of ways. For example, the recipient of the bill could physically take the paper to a location and personally complete the transaction. Alternatively, the recipient could manually fill out a form, write a check for the amount due and submit the form by mail. The recipient could also pay the bill online, by remembering the right URL, entering login details, and re-entering paper specific information like the bill number and amount. Each of these methods for completing a paper based transaction is time consuming, uses multiple steps, and often requires re-communicating information that is already on the paper or is derived from the paper.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
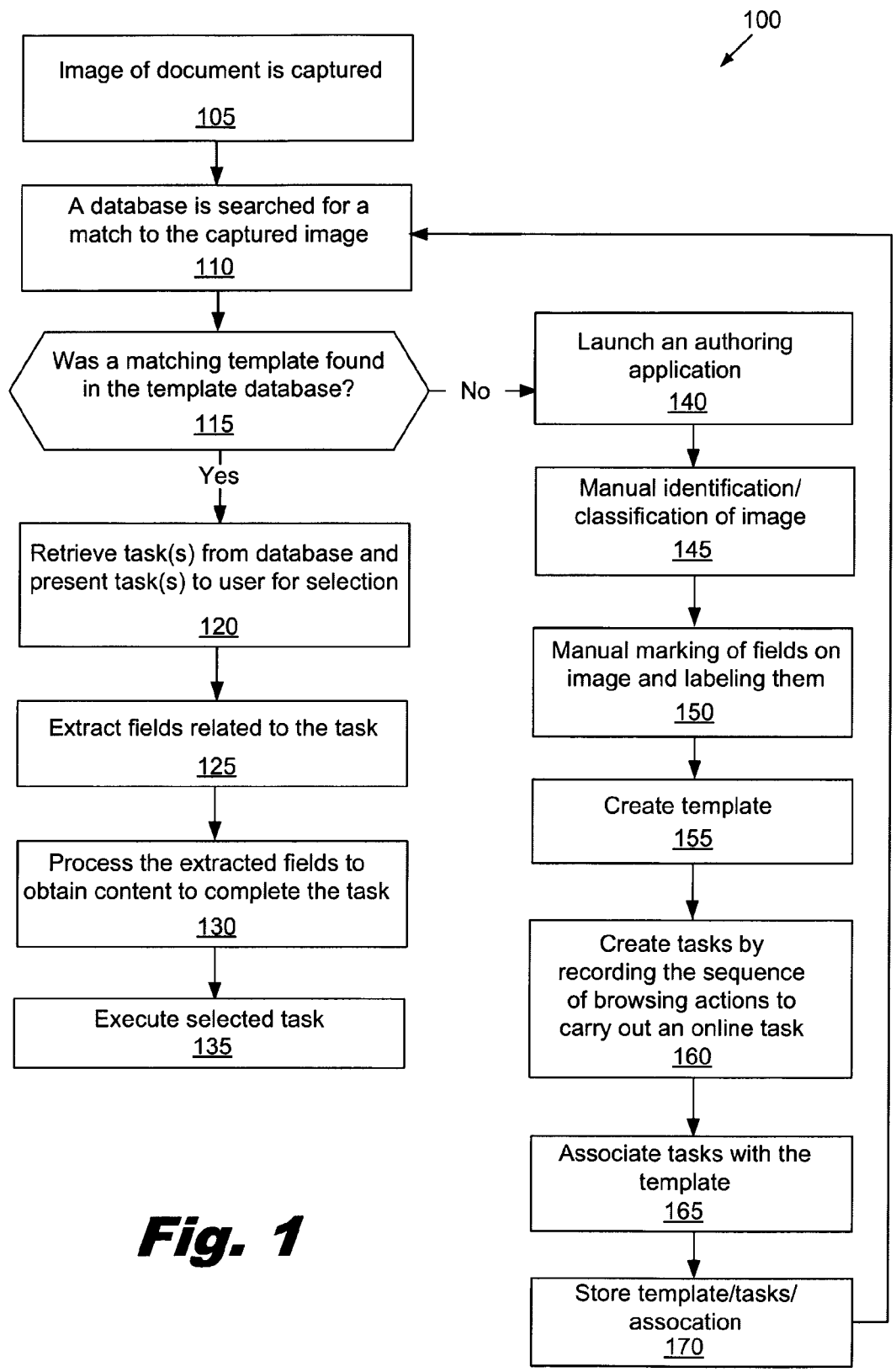
FIG. 1 is a flow chart of an illustrative method for making image triggered transactions, according to one example of principles described herein.

Paper triggered transactions can be greatly simplified by using a digital device with any appropriate capture device to capture an image of the document and execute an image triggered transaction. Image triggered transactions allow the paper or other printed or written material to be identified, the appropriate information extracted, and a web based or other transaction to be initiated. For example, a mobile phone user could image a utility bill using the mobile phone camera. The image triggered transaction application identifies the bill automatically based on the previously trained images and lets the user complete payment of the bill without having to open a web browser, enter a URL, enter a username and password, and reentering information from the bill. The application automatically extracts some of these parameters from the image of the paper. Other parameters, such as the user name and password could be stored on the device or entered manually. For example, the application may recognize the bill, associate the bill with a URL, and read the bill date, amount and user identifier. In one implementation, the application connects to the URL, authenticates the transaction, enters the payment amount, and any bank information needed to complete the transaction. For security, the user is asked to authorize the transaction by entering a password, biometric identifier or other identifier. This allows the user to accurately complete many common paper transactions with minimal time and effort. This is a significant simplification since to make a transaction on a website, one may need to navigate several pages to go to the page where the transaction needs to be carried out. Using this method, that navigation can be either eliminated or greatly reduced. There will also be provision to review the information and make any modification if necessary before submitting, for completing the transaction.

In some image based scenarios, there may be multiple tasks that can be performed by the application. The image can be used to trigger multiple possible transactions. For example, an airline or railroad ticket may include information about the specific airplane or train, the seating assignment, departure information, and other information. After receiving the image data of the ticket, the application could present the user with options for requesting the status of the flight or train, changing a seat assignment, rebooking on another flight, or other options. The data to initiate these transactions could be obtained from the image of the ticket. This provides the user with an intuitive, easy and convenient method for making transactions using a mobile device.

Occasionally, a user may want to base transactions on a document that has not been previously used by the application. In this case an authoring tool is provided to the user to define characteristics of the document and tasks that can be performed based on the information in the document. This authoring process can be applied to add a wide range of documents that are personalized to the user of the system. Alternatively, the user might connect to a cloud based central repository of pre-authored applications to access a template and tasks associated with the document.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

FIG. 1 is a flow chart of an illustrative method (100) for creating and executing image triggered transactions using an electronic image of a document. The document could be any of a number of different types of handwritten or printed documents. For example, the written document could be a printed utility or credit card bill, an airline or train ticket, a business card, an invitation, a billboard, a poster, a newspaper, an advertisement, a menu, a price list, an electronic display, or any other image that conveys information that could be used in a transaction.

An image of the document is captured (block 105) in digital form. The image may be captured in a variety of ways including using a scanner, a camera, or other imaging technology. For example, the image capture device could be a mobile phone with a camera, a personal computer with a web-camera or a specialized document imaging camera (Hover camera), a stand alone digital camera, a scanner, or any other image capture device that creates a digital representation of the document.

A template database is searched for a template that matches the captured image (block 110). The image may be analyzed for any of a number of characteristics, including aspect ratio of the document, the layout of the document, graphical elements such as logos, serial numbers, titles, or other identifying characteristics. These characteristics are matched against the templates. For example, geometric patterns of significant points in the document can be used to rapidly identify the document. The significant points can be derived from a variety markings, including word centroids, corners, crosses, straight lines in tables, etc. Additionally or alternatively, a large connected component such as a logo or letter head can also be used in identifying the document.

If a matching template is found in the database (block 115), the computing device presents one or more pre-authored tasks to the user for selection (block 120). For example, the tasks related to a bill may include verification of the charges and bill payment. Tasks associated with an invitation may include checking the user's calendar to determine if the time specified in the invitation is available, making an entry on the user's calendar to reserve the appointment time, and notifying the sender of the acceptance/rejection of the invitation. Tasks associated with a transportation ticket may include checking to determine the status of transportation, seat selection, cancelling or changing the reservation, upgrades, or other tasks such as set-up a notification to indicate any change related to reservation status/upgrade.

Other examples include written documents that the user marks up or fills out manually. Among other things, the markings can help identify the relevant parts of the document associated with the transaction. For example, a user may read the want ads or advertisements in the newspaper and circle items of interest. The marked pages of the newspaper can then be imaged and the appropriate tasks selected to contact the advertiser, obtain more information about the produce or service, and to make a transaction.

Another example of a user filled out document may be a chalk or white board that lists market prices or a daily special. The chalk or white board is imaged and appropriate tasks are presented to the user. For example, the task may include updating a website with the pricing and market information, communicating the information to a specific individual by text messaging, requesting supplies from a vendor, or other task. The examples given above are only illustrative. A wide variety of other conventional and nonconventional documents could be imaged and tasks associated with the documents presented to the user.

When the user selects a task, fields containing the information to execute the selected task are automatically extracted from the captured image (block 125). The fields may include numbers, text in a variety of languages, icons, positions, check marks, signatures or other information. The fields may be handwritten or printed.

The extracted fields are processed to obtain the content to complete the task (block 130). For example, optical character recognition, handwriting recognition, facial recognition, object recognition, edge finding, image analysis, or other suitable techniques can be used to process the fields. The recognition of capabilities of these techniques can be supplemented in a variety of ways, including providing the recognition module with an a priori knowledge of the format or type of data that is expected to be present in the field. For example, if the field is designated as a license number with 15 numerals or a price with four numerals, the recognition technique can increase its accuracy. The user may also have the opportunity to correct any errors which occur during the interaction.

The selected task is then executed (block 135). The specific execution of the task is not limited to any particular platform, protocol, network, or device. For example, a task may include opening a specific URL, entering data recognized in the fields into the website, accepting results from the URL, sending text messages, making voice calls, activating/controlling remote systems, obtaining additional data, making logical evaluations, writing data to a database, activating/interfacing with other applications, requesting additional input from the user, or other actions. Similarly, a user may share an authored task with other who use similar documents after appropriately masking private information.

Returning to block 115, if no matching template was found, an authoring application is launched (block 140). The authoring application guides the user through a series of actions to create a template and executable tasks based on information identified by the template. If any of the information to perform the task is not in the document or is not correctly identified, the user can point to other information or manually enter information and continue to authoring the task.

To form a template and associated task(s), the user manually identifies/classifies the captured image (block 145). For example, the user may enter an identifying string of characters. The user then manually marks the fields on the image and labels them for extraction (block 150). For example, these fields of interest may be designated using a stylus to outline an area containing data or by touching a computer generated outline of an area. Additional information may also be entered and associated with the fields. For example, in a utility bill the fields of interest may be the account number, the bill date, and the bill of interest. Additionally, if the authored image is being uploaded for the access by the other users, one can mask private information on the document.

A template of the image and fields is then created (block 155). The template may include a variety of other information including aspect ratio of the document, the layout of the document, graphical elements such as logos, serial numbers, titles, or other identifying characteristics or features like significant points and their patterns. In some documents machine readable symbologies like bar codes/QR codes could also be used to identify the document.

The tasks can be created in a variety of ways. For example, tasks may be created using a "programming-by-doing" approach that involves the creation of a task by recording a sequence of browsing actions to directly carryout the task (block 160). The recorded sequence is automatically packaged into a web widget that executes when selected. For example, the online task may be paying a utility bill. Most of the information used to perform the tasks are contained in the image of the bill. These task parameters are extracted from the fields designated by the user in the template. Any user inputs that are not found in the document image are designated as "unbound." and the users are prompted to supply these unbound inputs during the execution of the task. For example, a user password is an unbound input that the user will be prompted to manually enter during the creation of the task and during subsequent execution of the task. The tasks can be captured as web widgets. The web widgets can be stored in an online repository and are available for association with a variety of imaged documents.

The tasks are then associated with the template (block 165). For example, a web widget from the online repository may be associated with a template stored in a template repository. The association may specify mapping between the task's parameters and fields of interest in the template. The association can be published in conjunction with the web widget and template. Tasks may be mapped to more than one document template and vice versa. The templates, tasks, and associations are then stored in a database. The template and associated tasks can then be used by another user to trigger one of these tasks later when another instance of the same document type is imaged. For example, a utility company may author the bills that they generate and make the template and application or widget available to their customers. When the users image the utility bills in the future, the application automatically performs the desired task.

The illustrative method and blocks described above are examples. The various blocks could be reordered, added, deleted, or combined in specific applications. For example, once the transaction is complete, the image, image identifier, fields extracted, and other relevant transaction details such as metadata, date, and acknowledgement could be archived for any future queries or easy identification/recognition for later tasks. This information could also be passed on to other applications such as a personal document management system or personal account management system. Examples of these individual blocks and their interactions are further described and illustrated below.

Figure 2:
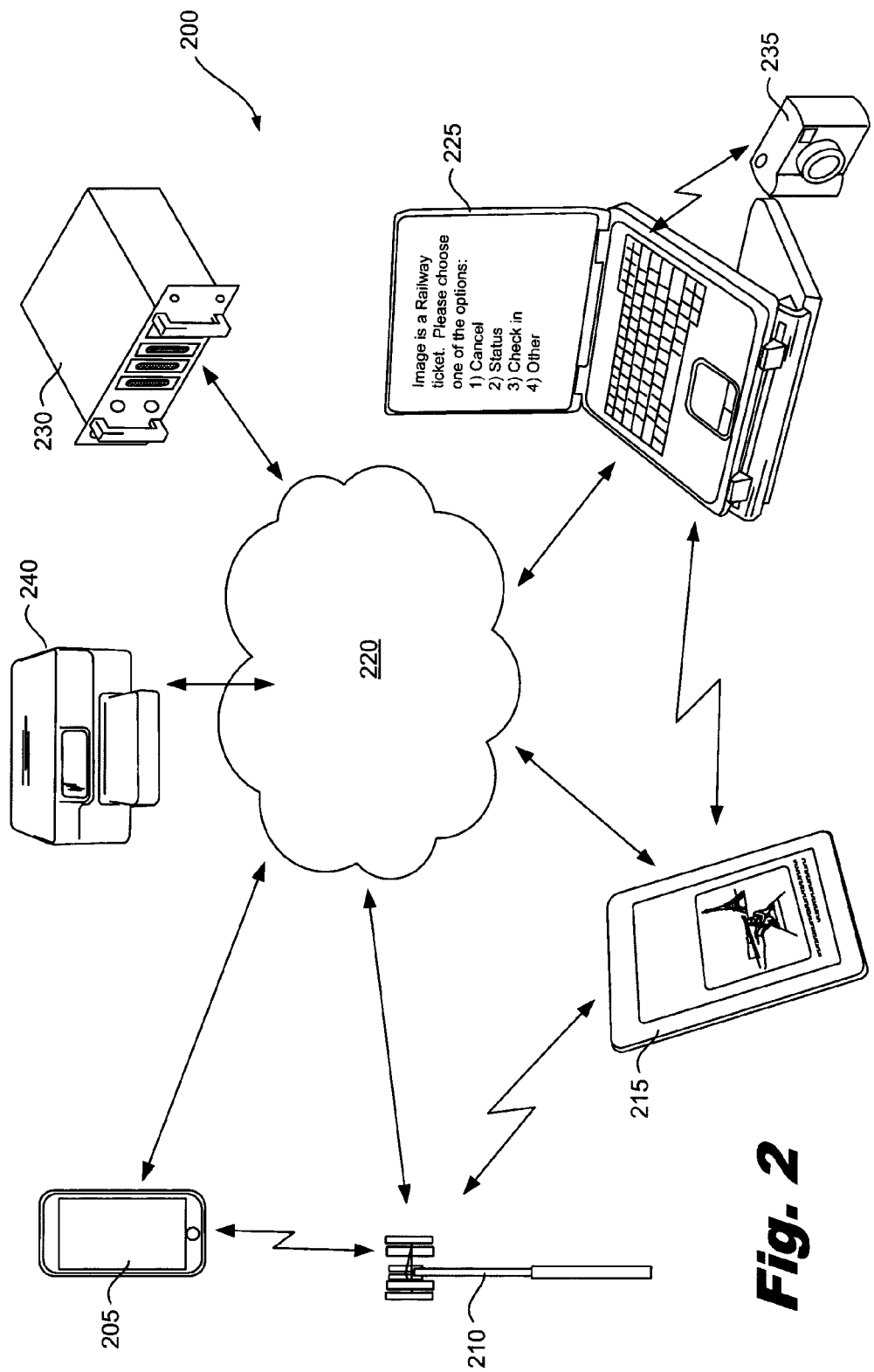
FIG. 2 is an illustrative network for making image triggered transactions, according to one example of principles described herein.

FIG. 2 is an illustrative network 200 of devices that can be used separately or in combination to create and execute image triggered transactions. The network 200 includes a number of illustrative devices including a web enabled mobile device 205, a cellular network 210, a tablet computer 215, a laptop 225, a digital camera 235, a server 230 and a combination printer/scanner 240. A number of other imaging/computing devices could be included in the network. In this example, the devices are connected directly or indirectly to the Internet 220. The Internet 220 can provide interconnectivity between devices, computing power, digital storage, software, access to websites and other features. For example, the mobile device 205 may take an image with an integral camera, process the image and access a website through either a direct internet connection or through the cellular network 210. The tablet computer 215 may directly image a document or may download the document from another source, such as the scanner 240. The tablet computer 215 may connect to the scanner in a variety of ways, including through the Internet 220, through a local area network or through a wireless network. The laptop computer 225 may also obtain document images. For example, the laptop computer 225 may use a built in web camera or connected to a hover camera or download pictures from a digital camera 235. The combination printer/scanner 240 can be used by itself to image the document and provide execution options to the user via its touch screen. Alternatively, the combination printer/scanner 240 could be used in conjunction with other devices. All of the computing devices could access the server 230 to store/retrieve data, access a website hosted by the server 230 or to access the computing power of the server. For example, the remote server 230 may host a website that can be accessed by a remote computing device to execute an image triggered transaction.

Figure 3:
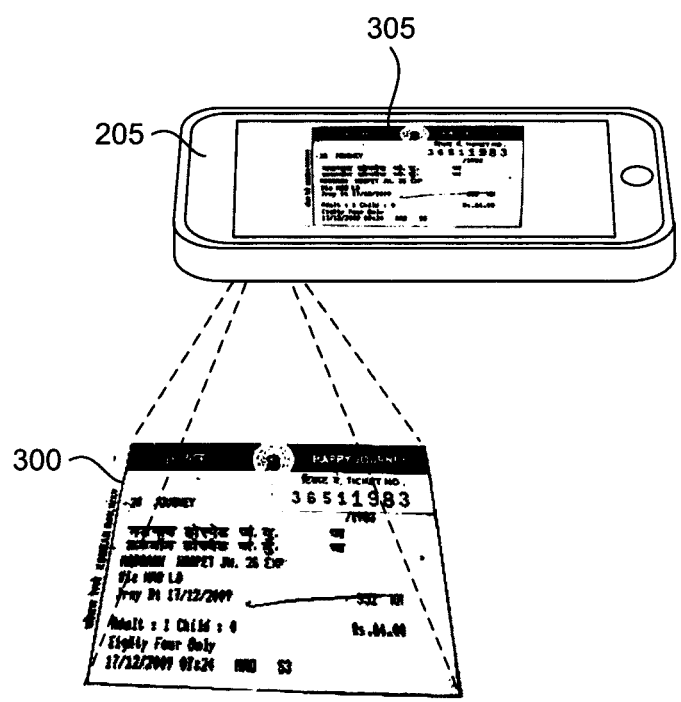
FIG. 3 is a perspective view of a camera equipped mobile device taking an image of a document, according to one example of principles described herein.

FIGS. 3-6 show illustrative actions in performing an image triggered transaction. FIG. 3 shows a mobile device 205 photographing a paper document (300). In this example, the paper document 300 is a railway ticket. The digital image 305 of the paper document 300 is displayed on the mobile device 205. This corresponds to block 105 in FIG. 1. In some implementations, the image may be transferred to a remote server or cloud computing services for image processing to compensate for skew, perspective distortion, variable illumination, cropping or blur. In other examples, the image processing can occur on the mobile device 205.

As described in FIG. 1, a database is then searched for a match to the captured image 305. The database may reside on the mobile device 205, on a remote server 230, or on another device. In this example, if there is no matching template found in the template database and the authoring application is launched. The user identifies/classifies the image by entering the document ID "Railway Ticket" (block 145, FIG. 1).

Figure 4:
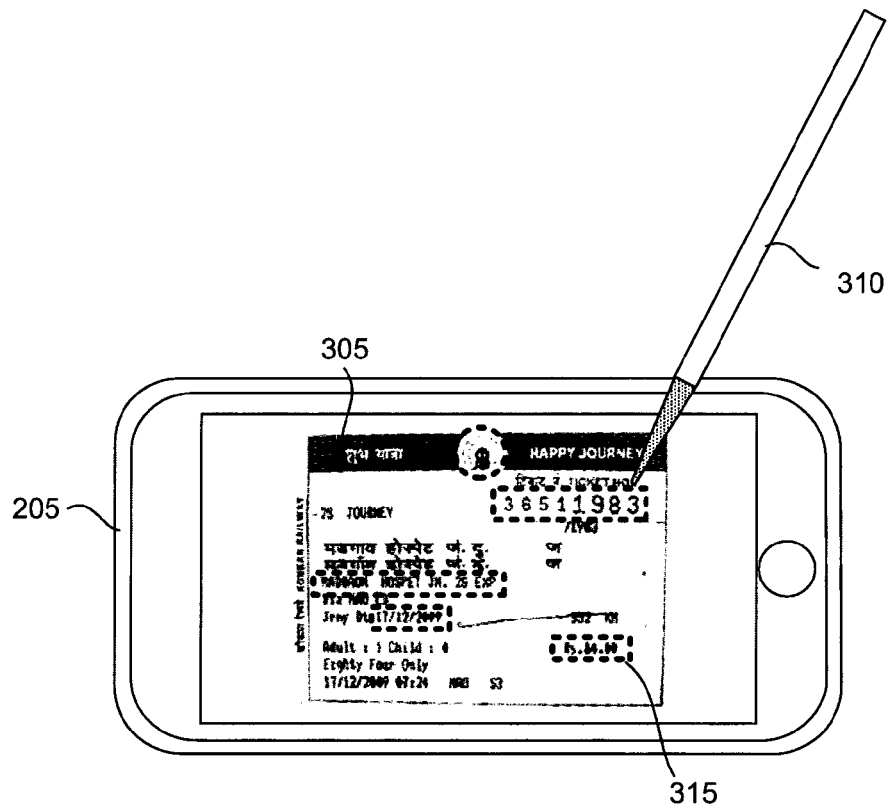
FIG. 4 is a plan view of a user marking fields within the document image, according to one example of principles described herein.

FIG. 4 shows the user continuing the authoring process by using a stylus 310 to extract fields 315 from the ticket image 305 displayed on the mobile device 205. A variety of other techniques can be used. For example, the computer could use image processing techniques to automatically outline fields and the user could touch the fields to select them. Additionally, the various fields could be labeled with speech commands such as Name, Date, Train, etc.

Figure 5:
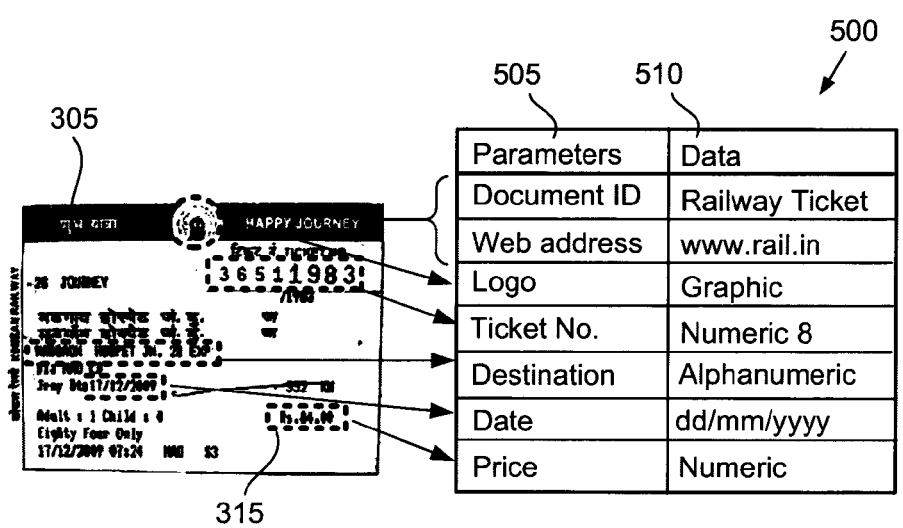
FIG. 5 is a diagram showing extraction of the marked fields into a data structure, according to one example of principles described herein.

FIG. 5 shows the various fields 315 being extracted from the ticket 305 into a data structure 500. In this example, the data structure 500 includes a parameter and a data format for each field 315. For example, the first parameter listed in the data structure 500 is the document ID and its associated value is "Railway Ticket". The second parameter is a pointer to the website "www.rail.in". This can direct the web transaction application to the appropriate website. The third parameter is a logo which has been previously identified in FIG. 4. This logo can be used as one characteristic for automatically identifying the document in the future. Other parameters include the ticket number, the destination, the date of the journey, and the price. For each of these parameters, the data gives information about an expected format and is stored in the template data structure. This format information assists the application in optical character recognition when similar railroad tickets are imaged in the future.

Figure 6:
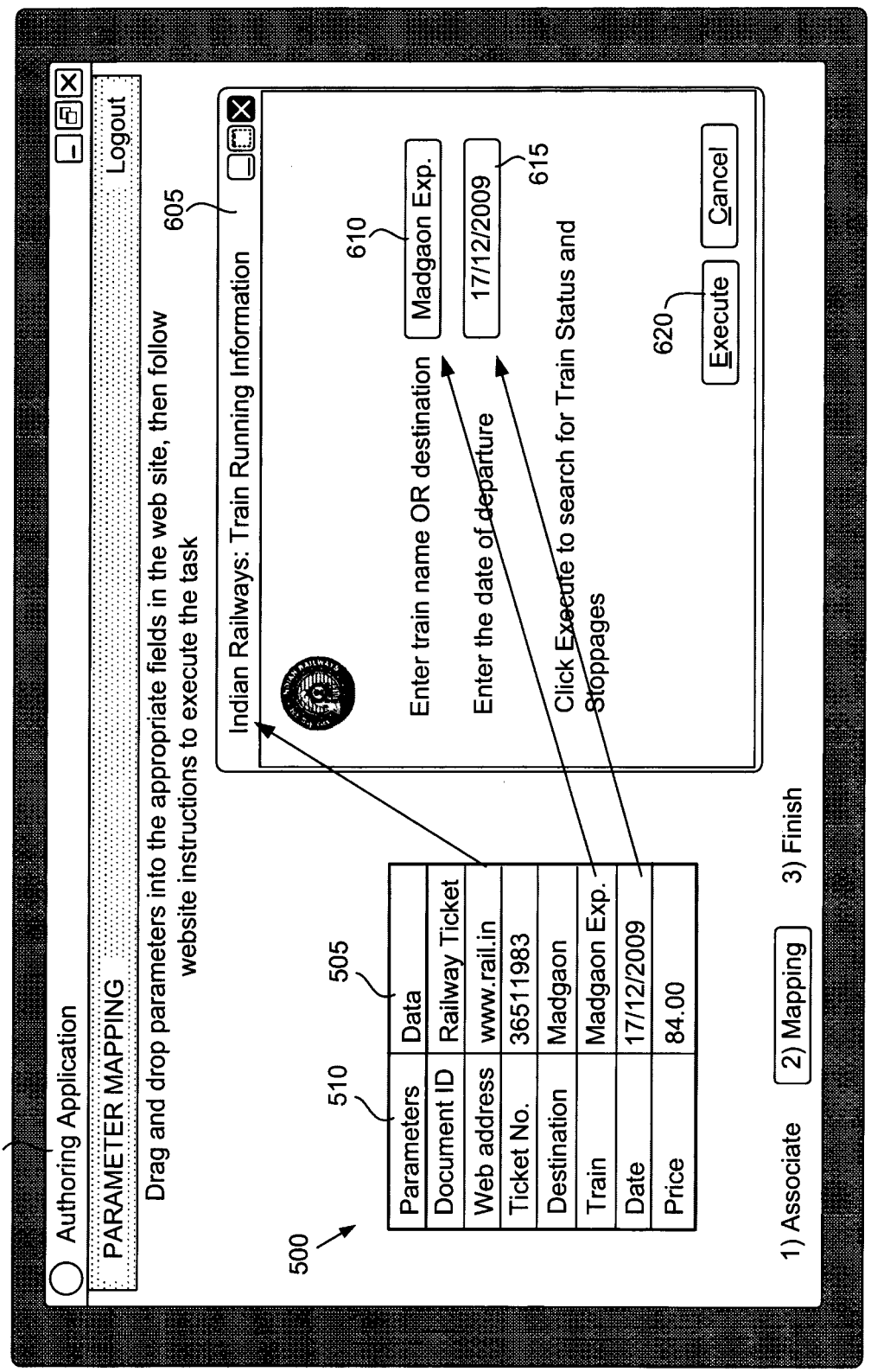
FIG. 6 is an illustrative screenshot of parameter mapping from a data structure to a website, according to one example of principles described herein.

FIG. 6 is an illustrative screen shot of an authoring application that allows actual data values extracted from the ticket to be entered into the web page. The series of actions taken by the user to execute the task are recorded and packaged into an automatically executable widget or executable. In this example, the user wants to determine the status of the train from the train ticket. For example, the user may first associate the image and extracted data structure with a task. Next, the user enters the appropriate web address to execute the task. In this example, the web address is "www.rail.in" which brings the user to the Indian Railways web site. The user wants to determine if the train they will be traveling on is on time or has any stoppages. The web page prompts the user to fill in two fields: the name of the train or the destination and the date of departure. This information is contained on the user's paper ticket and in the data structure 500 derived from the paper ticket. In this example, the name of the train is the Madgaon Express and the date of departure is Dec. 17, 2009. These parameters/variables are relevant to the task and are taken from the document based on the designated fields. The user can enter this data into the webpage 605 by selecting the appropriate data field from the data structure and dragging the data over the appropriate destination field within the web site. The train name is entered into the destination field 610 and the date of departure is entered into the destination field 615. The user then clicks the "Execute" button 620 at the bottom of the field. The website then returns the status of the designated train. These actions are recorded as a web widget or other executable and will be performed automatically in the future.

As discussed above, there are number of tasks that can be performed based on the same data structure 500. Using the data structure shown in FIG. 6, other actions could be taken on the Indian Railways website, other website, or communicated over a network. For example, the user could request a refund, change a seat assignment, change trains, change departure times, request scheduling information, book recurring travel, communicate travel plans to others, or perform other related tasks. Each of these tasks can be recorded within the authoring application and later be presented as options for automatic execution. In one implementation, the subsequent automatic execution of these tasks does not require access to or operation of a conventional computer. The user can simply take a picture of the document with a web enabled mobile device, select one of the available tasks and have the automatically transaction executed. This approach is particularly useful for small mobile devices where providing inputs is not as convenient due to the form factor of the device.

This process could be used for a wide variety of documents and situations. For example, this process could be used to communicate local prices and other market information. Many rural farmers in emerging countries grow and transport their produce to local markets. They naturally want to bring their produce to markets where it is in high demand, will sell quickly and at the highest price. In many cases their access to this information is severely limited. First the information is not widely distributed. It may be written down in the market place on a chalkboard or wipe board, but not further distributed. Additionally, even if the prices in the market place were available on the web, rural farmers often lack computer access and skills to obtain the market information.

However, mobile phones are becoming more widely available and are more intuitive to operate. Using the image triggered transaction application described above, the farmers could take images of wipe boards in various market places. For example, the chalk board or wipe board could have pre-printed blank form with named fields in which the users can write the latest information, including prices, quantity, inventory, etc. This information could be automatically extracted from the images and posted to a website or texted to other interested parties. This will increase the efficiency of the rural markets and benefit both the farmers and the consumers. Further, the farmers could access the web based information using their mobile devices. For example, a farmer may image a blank document that is used to record the prices of local produce. In response, an image triggered transaction occurs that automatically finds the prices for the local goods and conveys them to the farmer.

In some implementations, handwritten symbols may be used to improve the handwriting recognition of the system. For example, square brackets could be used to designate a field or document identifier on a handwritten or printed page. A triangle may be used to indicate a particular task to be executed or web address that should be accessed. In this way, a handwritten document can be annotated to designate fields, actions, and tasks that are automatically recognized during analysis of an image of the document.

Figure 7:
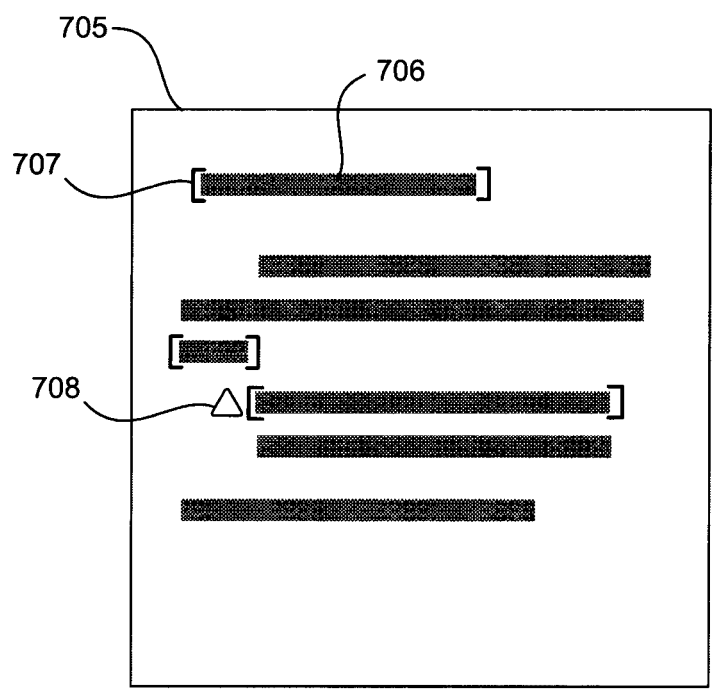
FIG. 7 is an illustrative handwritten document that contains marked fields, according to one example of principles described herein.

FIG. 7 is an illustrative diagram of a handwritten document 705 with lines of handwriting 706 represented by shaded boxes. Square brackets 707 designate fields which are relevant to identifying the document or executing a task. The triangle 708 shows a field upon which action should be taken. As discussed above, the field may be a web address that should be access. A variety of other marks could be used. For example, circled numbers could be used to indicate a sequence or as field identifiers. Additionally or alternatively, lines could be drawn between fields to indicate relationships or sequences.

One challenge for speakers of languages that do not use the Roman alphabet to represent written words is that keyboards of computing devices may not be designed to communicate in their native language. For example, some speakers of Urdu or other native dialects in India may be more comfortable using handwriting to communicate than using a keyboard designed for entry of the Roman alphabet. The use of image triggered web transactions can allow them to write in the language and characters that they are comfortable with, image the document with their mobile phone, and then execute web or other transactions without ever having to use a conventional computer/keyboard or web browser. This allows the users to access online services without the hurdles of obtaining a PC, understanding web page addressing, navigation, or using a conventional keyboard.

Figure 8:
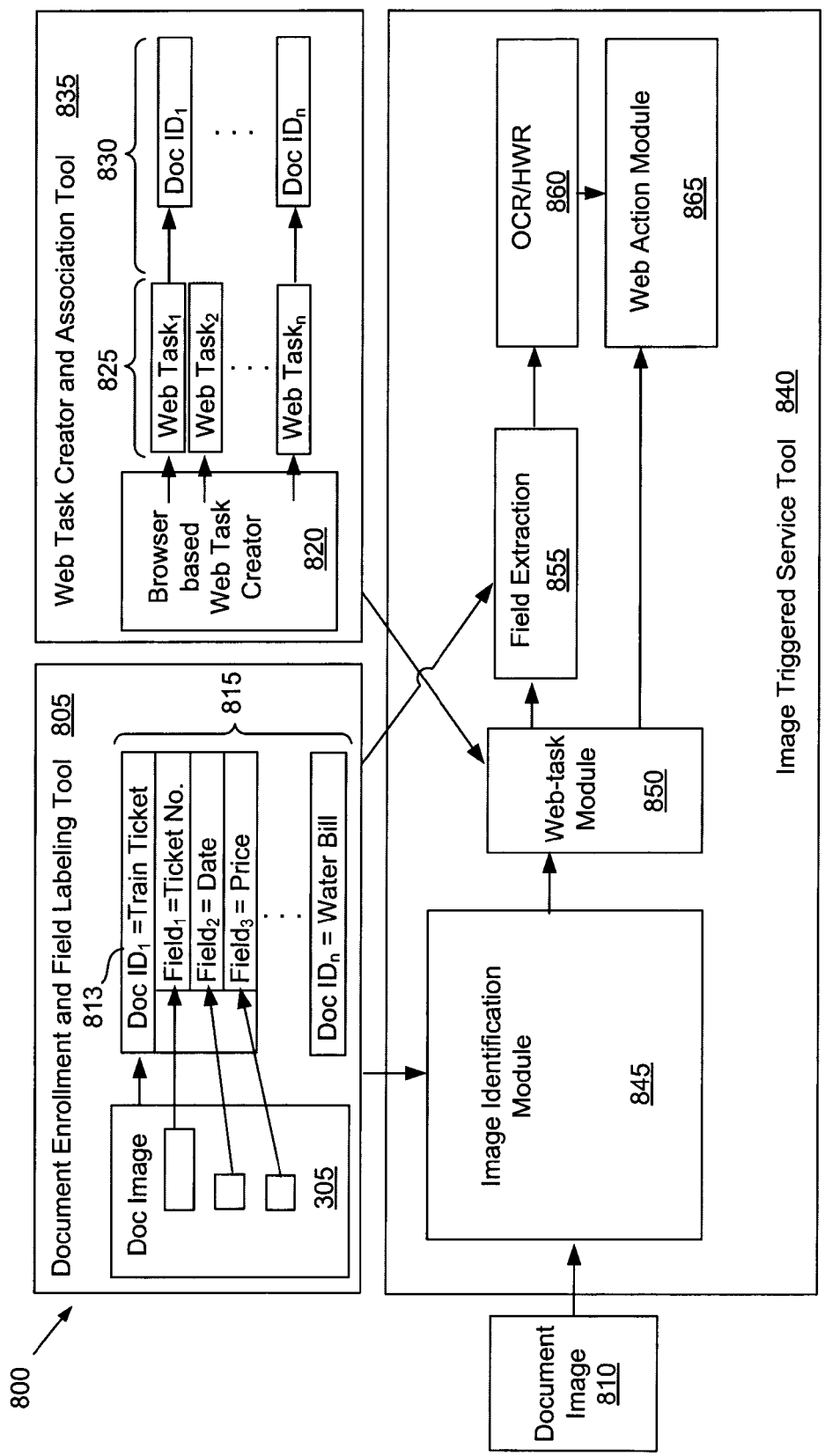
FIG. 8 is block diagram of data flow in making an image triggered transaction, according to one example of principles described herein.

FIG. 8 is a diagram of data flow through a system for image triggered transactions 800. In this diagram, the system 800 is divided into three major modules: a document enrollment and field labeling tool 805, a web task creator and association tool 835, and an image triggered service orchestration 840. The document enrollment and field labeling tool 805 includes an initial document image 305. The document enrollment and field labeling tool 805 guides the user through identification of the initial document image 305, enrolling it in the system for image triggered transactions, and selecting/labeling fields to create a document template 813 for inclusion in the database 815. For each document, the database 815 contains a document template that includes a document identifier and various values that are extracted from fields in the initial document image 305.

The web task creator and association tool 835 includes a browser based web task creator 820 that guides the user through the creation of web tasks 825 and forming associations 830 between the web tasks and various document identifiers. In one implementation, the web task creator 820 records a sequence of browsing actions performed to carryout the task. This recorded sequence of actions forms the basis for the web task. A variety of other tools could be included, such as tools that allow the user to create tasks that automatically generate text messages, dial telephone numbers, or other tasks.

The output of the document enrollment and field labeling tool 705 is received by the image triggered service orchestration tool 840. An image identification module 845 uses robust document identification techniques and handwritten/symbol extraction to identify a new document image 810 by accessing the database 815 and searching for the match between the new document image 810 and characteristics of an image stored in the template database 813. Once the document is identified, a web-task module 850 presents various web-tasks associated with the document to the users. These associations and tasks are supplied by the web task creator and association tool 835. The user identifies the desired web-task and the system proceeds to a field extraction module 855 that extracts portions of the document image that contain the fields needed to execute the task. An optical character recognition and handwriting recognition module 860 extracts the values from the extracted fields. The web actions are then executed by web action module 865.

In some examples, the document enrollment and field labeling tool 805 and the web task creator and association tool 835 may be operated by the creator of the document. For example, the railway may enroll each of the ticket formats, label the fields, create the web tasks, and associate the web tasks with the appropriate documents. The end users then can easily download a widget or application, capture an image of the document, and select the task to be performed. These web tasks could be provided as web services by the railways to their customers.

The systems and methods described above are illustrative examples of the principles described herein. A number of variations could be made. For example, the image based application could be used for remote submission of a form. The user fills in a blank paper form and then images it. The data on the form is automatically sent to the appropriate database. The image based application could also be used to check the validity of information. For example, an image could be taken of a driving license to obtain information about previous driving offences of the driver. The identity of the driver could also be confirmed using face verification technology to match the current driver.

In conclusion, the image triggered transaction systems and methods described above facilitate transactions by accepting an image of a document and automatically identifying it and finding tasks and digital interfaces associated with the document. The image triggered transaction continues by automatically extracting data from the document image and automatically organizing the data into a format that is compatible with the application/digital interface/web service that will execute the transaction. The transaction is then executed and results are provided to the user. Because the image triggered transaction can be initiated and controlled through a mobile device, the financial and knowledge barriers to sharing data and accessing services can be substantially lowered.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for image triggered transactions comprising:
   capturing, by an image-capturing device, an image of a document;
   searching, by a processor of a computing device, a database for a matching template matching the captured image;
   if a matching template is found for the captured image, retrieving, by the processor, a pre-authored task associated with the captured image;
   extracting, by the processor, fields from the captured image related to the task;
   processing, by the processor, the extracted fields to obtain content to complete the task, including performing optical character recognition (OCR) on the captured image;
   executing the task, by the processor, comprising:
      opening a web page of a web site located at a universal resource locator (URL) address; and
      entering the content obtained from the extracted fields within corresponding fields of the web page;
      returning results from the web site responsive to entering the content within the corresponding fields of the web page; and
   if a matching template is not found for the captured image, then launching, by the processor, an authoring application to add the captured image as a new template and author tasks associated with the captured image.

2. The method of claim 1, further comprising if multiple tasks are associated with the captured image, presenting the tasks to a user as options for selection.

3. The method of claim 1, further comprising classifying the captured image and identifying authored activities for the document.

4. The method of claim 1, further comprising designating and extracting fields from the captured image.

5. The method of claim 4, in which designating a field in the captured image comprises outlining a portion of the captured image.

6. The method of claim 4, further comprising creation of tasks using information contained in the extracted fields.

7. The method of claim 6, in which the creation of tasks comprises recording a sequence of browsing actions to carry out an online task.

8. The method of claim 7, further prompting a user to supply unbound inputs for entry within the corresponding fields of the web page that are not found within the content obtained from the extracted fields, during the execution of the task.

9. The method of claim 7, further comprising storing a template of the captured image and associated tasks in the database for subsequent retrieval when a similar document is imaged.

10. The method of claim 1, in which the document comprises handwritten graphical markup instructions which designate fields and task instructions.

11. A method for image triggered transactions comprising:
    capturing and displaying an image of a document with a mobile device equipped with a camera;
    searching, by a processor of the mobile device, a database for a match to the captured image;
    if a matching template is not found for the captured image, launching, by the processor, an authoring application on the mobile device;
    classifying, by the processor, the captured image;
    designating and extracting, by the processor, fields from the captured image by selecting portions of the captured image displayed on the mobile device;
    creating, by the processor, a web task using information contained in the extracted fields by recording a sequence of browsing actions by a user, the web task comprising:
       opening a web page of a web site located at a universal resource locator (URL) address;
       entering content obtained from the extracted fields via optical character recognition (OCR) within corresponding fields of the web page; and
       returning results from the web site responsive to entering the content within the corresponding fields of the web page.

12. The system of claim 11, further comprising:
    a field extraction module for extracting fields designated in a document template that matches the document image; and
    an optical character recognition/handwriting recognition module which extracts content from the extracted fields; and
    a web action module for performing web based tasks.

13. The system of claim 11, in which the web based task created by the web task creator and association tool comprises a sequence of browsing actions by a user.

14. A system for image triggered transactions comprising:
    a mobile device equipped with a camera;
    a memory storing a document image captured by the camera equipped mobile device;
    a storage device storing a database containing document templates;
    a processor;
    a non-transitory computer-readable data storage medium storing computer-executable code executable by the processor to implement:

an image identification module for identifying the image by accessing the database of document templates;

a web task creator and association tool for creating web based tasks and associating the web based tasks with document templates stored in the database; and a web-task module for retrieving a web based task associated with the document image and for retrieving tasks associated with the image, the web based task comprising:

opening a web page of a web site located at a universal resource locator (URL) address;

entering content obtained from extracted fields of the image via optical character recognition (OCR) within corresponding fields of the web page; and returning results from the web site responsive to entering the content within the corresponding fields of the web page.

* * * * *